(12) United States Patent
Sindlinger

(10) Patent No.: US 9,540,022 B2
(45) Date of Patent: *Jan. 10, 2017

(54) LIVESTOCK CHUTE PULLER AND A METHOD OF USING THE SAME

(71) Applicant: WEAVER LEATHER, LLC, Mt. Hope, OH (US)

(72) Inventor: Steven K. Sindlinger, Apple Creek, OH (US)

(73) Assignee: Weaver Leather, LLC, Mt. Hope, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,838

(22) Filed: Dec. 21, 2015

(65) Prior Publication Data
US 2016/0107666 A1    Apr. 21, 2016

Related U.S. Application Data

(63) Continuation of application No. 14/069,940, filed on Nov. 1, 2013, now Pat. No. 9,216,750.

(51) Int. Cl.
| | |
|---|---|
| *B62B 1/00* | (2006.01) |
| *B62B 1/06* | (2006.01) |
| *A01K 1/06* | (2006.01) |
| *A01K 1/00* | (2006.01) |
| *B60P 3/04* | (2006.01) |
| *B65G 67/04* | (2006.01) |
| *B62B 5/00* | (2006.01) |
| *B62B 1/14* | (2006.01) |

(52) U.S. Cl.
CPC ............... *B62B 1/06* (2013.01); *A01K 1/0035* (2013.01); *A01K 1/0613* (2013.01); *B60P 3/04* (2013.01); *B62B 1/00* (2013.01); *B62B 1/14* (2013.01); *B62B 5/0079* (2013.01); *B62B 5/0089* (2013.01); *B65G 67/04* (2013.01); *B62B 2202/42* (2013.01); *B62B 2202/90* (2013.01)

(58) Field of Classification Search
CPC ........ B62B 1/26; B62B 5/0083; B62B 5/0089; B62B 1/12; B62B 1/00; B62B 3/00; B62B 5/00; B62B 7/00; B62B 9/00
See application file for complete search history.

(56) References Cited

U.S. PATENT DOCUMENTS

| | | |
|---|---|---|
| 2,339,940 A | 1/1944 | Noros |
| 2,421,322 A | 5/1947 | Frazin |
| 2,472,989 A | 6/1949 | Skipper et al. |

(Continued)

*Primary Examiner* — Hau Phan
(74) *Attorney, Agent, or Firm* — Sand & Sebolt

(57) ABSTRACT

A cart enabling a single person to pull a livestock chute across the ground. The cart includes a bar having a handle and wheels provided at opposing ends. The bar includes first and second members pivotally engaged together. A crossbar pivotally mounted on the bar includes first and second arms configured to engage handles on a lower front end of the chute. When the bar is in a collapsed position, where the first and second members are disposed at an angle to each other, the first and second arms are insertable into the chute handles. When the bar is moved to an erected position, where the first and second members are aligned along the same plane, a force is applied to a footrest on the bar. The arms lift the front end of the chute off the ground and the cart's wheels move under the front end of the chute.

7 Claims, 12 Drawing Sheets

(56) References Cited

U.S. PATENT DOCUMENTS

| | | | |
|---|---|---|---|
| 4,180,253 A | | 12/1979 | Ivers et al. |
| 4,214,774 A | | 7/1980 | Kluge |
| 4,333,617 A | | 6/1982 | Hamilton |
| 4,861,057 A | | 8/1989 | Kunkle |
| 5,037,118 A | * | 8/1991 | Straube ................ B62B 5/0083 |
| | | | 280/147 |
| 5,586,778 A | | 12/1996 | Lindh et al. |
| 5,716,061 A | | 2/1998 | Sloan et al. |
| 6,332,620 B1 | | 12/2001 | Mosher et al. |
| 6,474,625 B2 | | 11/2002 | Bevre |
| 6,637,761 B1 | * | 10/2003 | Boettcher ................ B62B 1/12 |
| | | | 280/47.24 |
| 7,350,790 B1 | * | 4/2008 | Wilson .................... B60D 1/00 |
| | | | 280/402 |
| 7,845,670 B2 | * | 12/2010 | Oberg .................... B60D 1/66 |
| | | | 280/47.24 |
| 7,886,853 B2 | * | 2/2011 | Konopa .................... B62B 1/26 |
| | | | 180/19.1 |
| 7,914,015 B2 | | 3/2011 | Tompkins |
| 8,061,722 B2 | | 11/2011 | Price et al. |
| 8,517,401 B1 | * | 8/2013 | Horn .................... B62B 5/0089 |
| | | | 280/47.15 |
| 2003/0062699 A1 | | 4/2003 | Gargaro |
| 2004/0021280 A1 | | 2/2004 | Peggs |
| 2005/0254927 A1 | | 11/2005 | Swetman et al. |
| 2007/0246911 A1 | | 10/2007 | Shawyer |

* cited by examiner

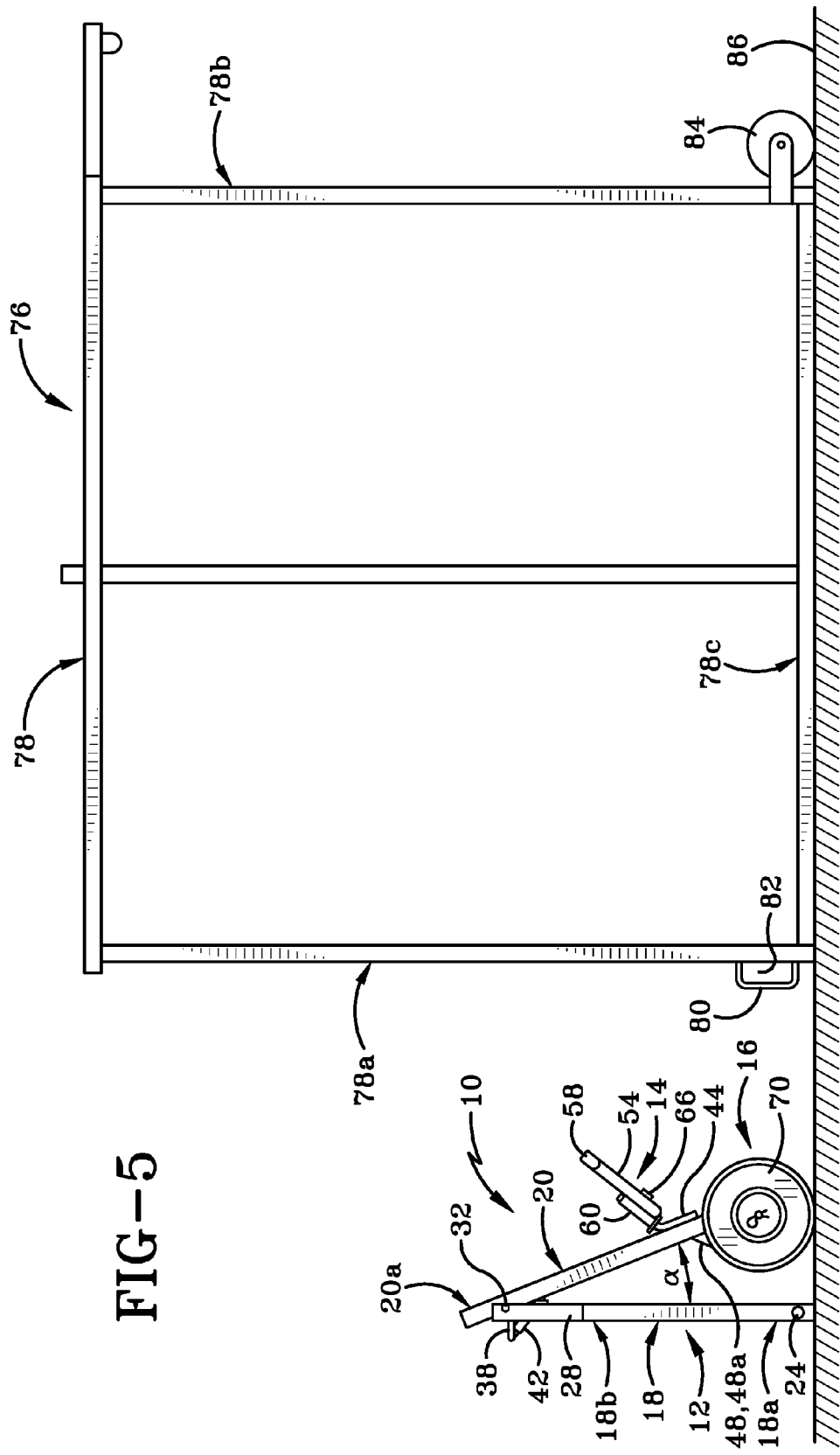

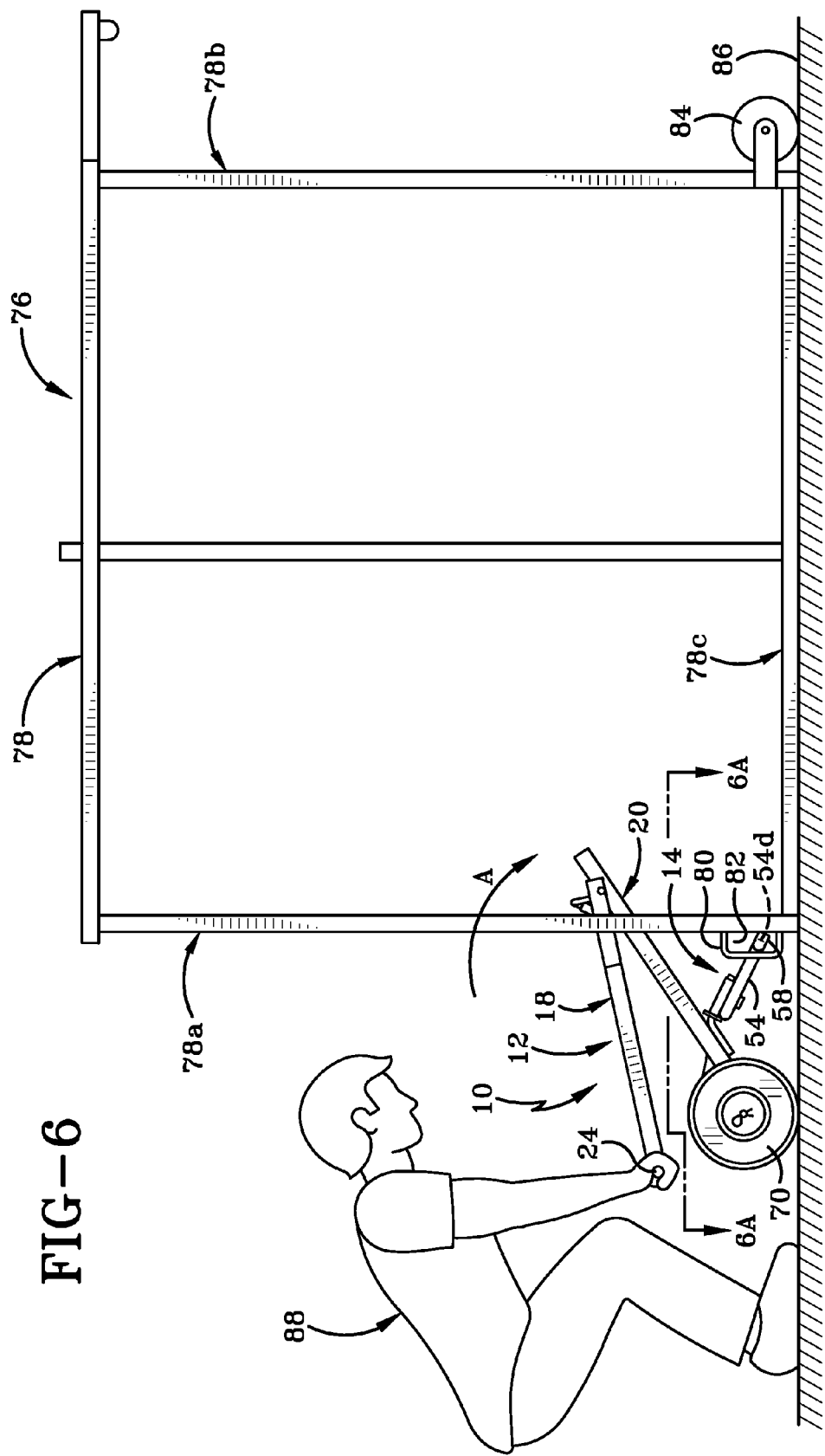

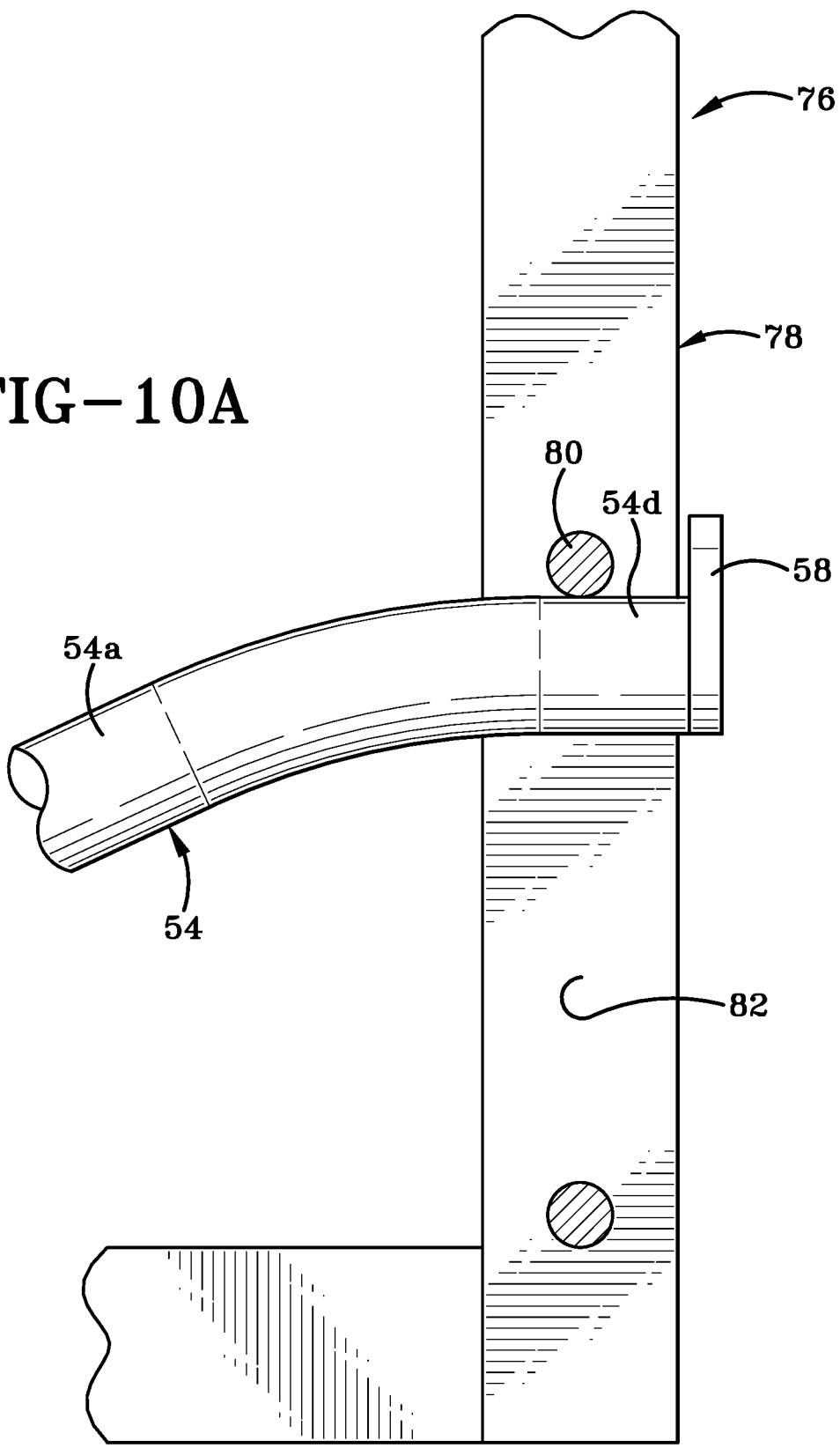

LIVESTOCK CHUTE PULLER AND A METHOD OF USING THE SAME

CROSS REFERENCE TO RELATED APPLICATIONS

This application is a continuation application from co-pending U.S. patent application Ser. No. 14/069,940, filed on Nov. 1, 2013, the entirety of which is hereby incorporated by reference as if fully rewritten.

BACKGROUND

Technical Field

This disclosure relates generally to farm equipment. More specifically this disclosure relates to equipment used to work with livestock. In particular, this disclosure is a device for engaging a livestock chute and which enables a single person to move the chute from one location to another.

Background Information

Livestock chutes are individual stalls into which large animals, such as cattle, are moved for examination or treatment. The stalls have sidewalls and front gates. The front gate is closed and the animal is led into the space between the sidewalls. At that point the animal is trapped within the chute. The space within the chute is kept quite small so that the animal is confined therein and does not have much room to move around. This ensures that the animal is kept fairly motionless so that they can be examined or treated.

Typically, livestock chutes are fabricated from metal as they need to withstand the forces that these large animals can bring to bear upon the sidewalls. As such, the chutes themselves can be fairly heavy.

There is therefore a need in the art for a piece of equipment that will enable a single person to readily and relatively easily move a livestock chute over a ground surface.

SUMMARY

A cart enabling a single person to pull a livestock chute across a ground surface is disclosed. The cart includes a bar having a handle and wheels provided at opposing ends. The bar includes first and second members pivotally engaged together. A crossbar pivotally mounted on the bar includes first and second arms configured to engage handles on a lower front end of the chute. When the bar is in a collapsed position, where the first and second members are disposed at an angle to each other, the first and second arms are insertable into the chute handles. The bar is moved to an erected position, where the first and second members become aligned along the same plane. The arms on the crossbar lift the front end of the chute off the ground and the cart's wheels move inwardly under the front end of the chute.

In one aspect, the disclosure may provide a cart for moving a livestock chute from a first location to a second location across a ground surface; said cart comprising:
  a bar comprising a first member and a second member disposed in end-to-end relationship and pivotally engaged with each other;
  a handle provided proximate a first end of the first member;
  a wheel assembly provided proximate a second end of the second member; and
  a crossbar engaged with the second member and being disposed generally at right angles thereto; wherein the crossbar includes a first arm and a second arm; and each of the first and second arms is adapted to engage one of a pair of handles provided on a front end of the livestock chute and lift the front end of the chute off the ground surface.

In another aspect, the disclosure may provide a mobile livestock chute assembly comprising in combination:
  a livestock chute having opposing sides, a front end and a back end, all extending upwardly from a bottom; said chute including a pair of handles provided on the front end and a pair of wheels provided on the back end; and wherein each handle defines an aperture therein; and
  a chute puller configured to engage the chute and to move the chute across a ground surface; wherein the chute puller includes;
    a bar comprising a first member and a second member disposed in end-to-end relationship and pivotally engaged with each other;
    a handle provided proximate a first end of the first member;
    a wheel assembly provided proximate a second end of the second member; and
    a crossbar engaged with the second member and being disposed generally at right angles thereto; wherein the crossbar includes a first arm and a second arm; and each of the first and second arms is adapted to engage one of a pair of handles provided on a front end of the livestock chute and lift the front end of the chute off the ground surface.

In another aspect, the disclosure may provide a method of moving a livestock chute from a first location to a second location across a ground surface; said method comprising the steps of:
  providing a chute puller including a wheel assembly, a bar extending outwardly from the wheel assembly; said bar including a first member having a handle proximate a first end; and a second member with which the wheel assembly is engaged; and wherein the first and second members are pivotally engaged with each other; and a crossbar having a first arm and a second arm mounted on the second member;
  inserting the first arm of the crossbar into a first aperture in a first handle provided on a front end of the livestock chute;
  inserting the second arm of the crossbar into a second aperture in a second handle mounted on the front end of the livestock chute;
  pivoting the first member of the chute puller from a first position where it is disposed at an angle relative to the second member; to a second position where the first member is aligned with the second member along the same plane;
  raising the handles on the chute away from the ground surface using the first and second arms and thereby lifting the front end of the chute upwardly away from the ground surface; and
  moving wheels on the wheel assembly into a position where they are disposed vertically under the front end of the chute.

In a further aspect, the disclosure may provide a method which includes the steps of:
  supporting the chute on the wheels of the wheel assembly and on one or more wheels provided on a back end of the chute;

pulling the handle on the first end of the bar to roll the wheels of the wheel assembly and the wheels on the chute over the ground surface.

In a still further aspect, the disclosure may provide a method where the chute puller is operable by a single person to move the livestock chute over the ground surface.

BRIEF DESCRIPTION OF THE SEVERAL VIEWS OF THE DRAWINGS

A sample embodiment of the disclosure, illustrative of the best mode in which Applicant contemplates applying the principles, is set forth in the following description, is shown in the drawings and is particularly and distinctly pointed out and set forth in the appended claims.

FIG. 5 is a right side view of the chute puller disposed adjacent an end of a livestock chute to be moved; where the chute puller is shown in a collapsed and disengaged position;

FIG. 6 is a right side view of the chute puller and the chute showing a user initially engaging the collapsed chute puller with the chute;

FIG. 10A is front partial cross-sectional view of the crossbar engaged with the handle at the front end of the chute and taken along line 10A-10A of FIG. 10.

Similar numbers refer to similar parts throughout the drawings.

DETAILED DESCRIPTION

Figure 1:
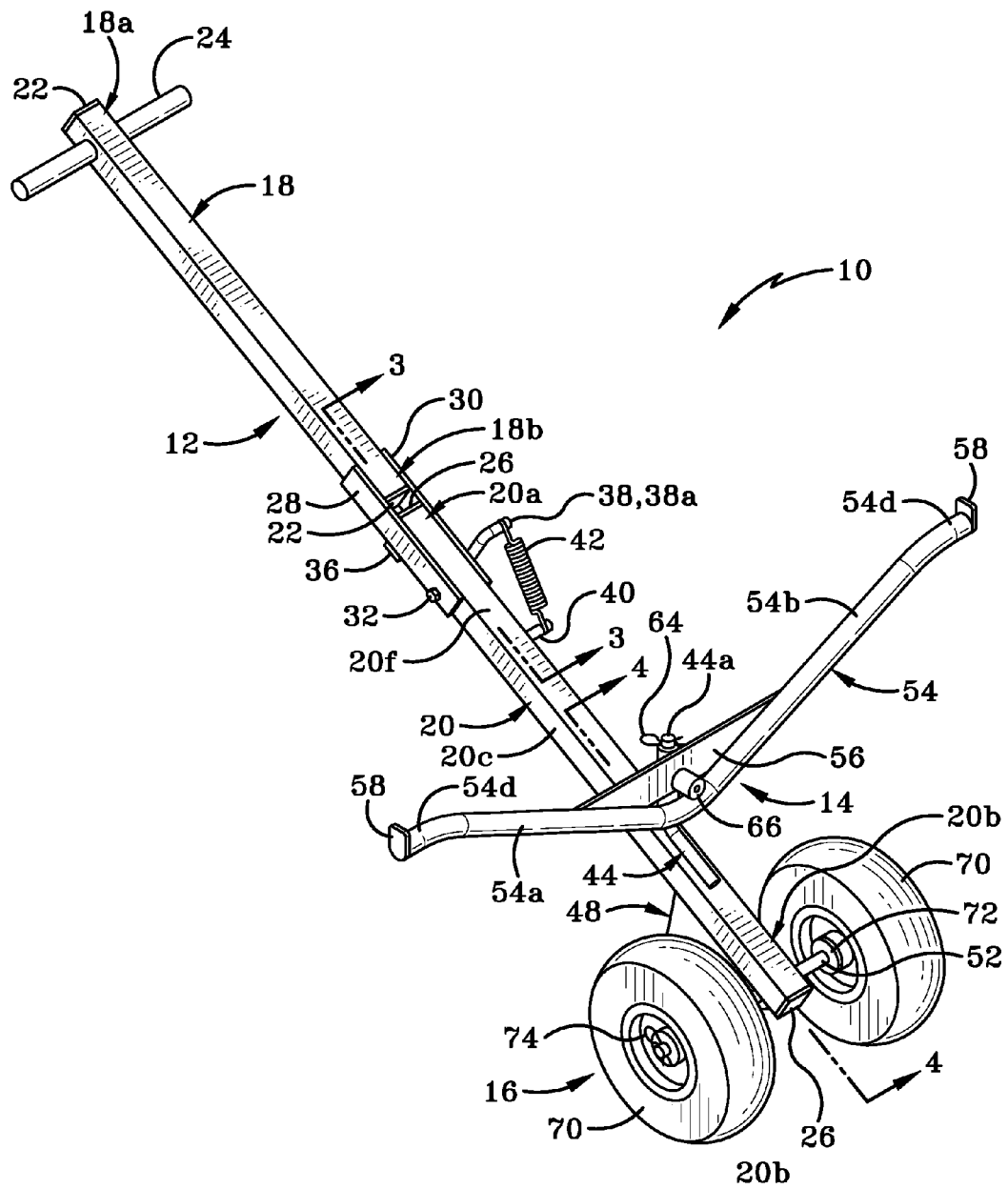
FIG. 1 is a perspective view of a chute puller in accordance with an aspect of the disclosure, shown in a fully erected position.

Referring to FIGS. 1-4, there is shown a chute puller in accordance with an aspect of the present disclosure, and generally indicated at 10. Puller 10 comprises an elongate bar 12, a crossbar 14 and a wheel assembly 16.

Tube 12 comprises a first member 18 and a second member 20. Each of the first and second members 18, 20 preferably is an elongate, hollow tubular member that is generally square in cross-section and has a cavity which runs from one end of the tubular member to the other. The first and second members 18, 20 may be differently configured but this shape has been found to be both strong and lightweight and therefore suitable for use in chute puller 10.

First member 18 has a first end 18a and a second end 18b and a longitudinal axis "Y" runs from first end 18a to second end 18b and is disposed generally at right angles to end caps 22 (FIG. 3) fitted therein. A rod 24 extends through aligned apertures (not numbered) defined a distance inwardly from first end 18a of first member 18 and is fixedly engaged therein. Rod 24 is disposed at right angles to longitudinal axis "Y: and acts as a handle for chute puller 10.

Second member 20 has a first end 20a and a second end 20b and has a longitudinal axis "Y" which runs from first end 20a through to second end 20b and is disposed at right angles to end caps 26 (FIG. 3) fitted therein.

Chute puller 10 further includes a pair of flanges 28, 30. Each flange 28, 30 is welded to one of the sidewalls of first member 18. Flanges 28, 30 originate a distance inwardly from second end 18b and extend for a distance outwardly beyond second end 18b. Thus, when chute puller 10 is in the erected position (shown in FIG. 1), flanges 28, 30 extend for a distance beyond first end 20a of second member 20 and adjacent sections of the sidewalls of second member 20.

A bolt or pivot rod 32 extends through aligned apertures (not numbered) defined in one or both flanges 28, 30 and in the two sidewalls 20c, 20d (FIGS. 2, 3) of second member 20. Bolt 32 secures first and second members 18, 20 together via flanges 28, 30 and also enables them to be pivoted relative to each other.

Figure 3:
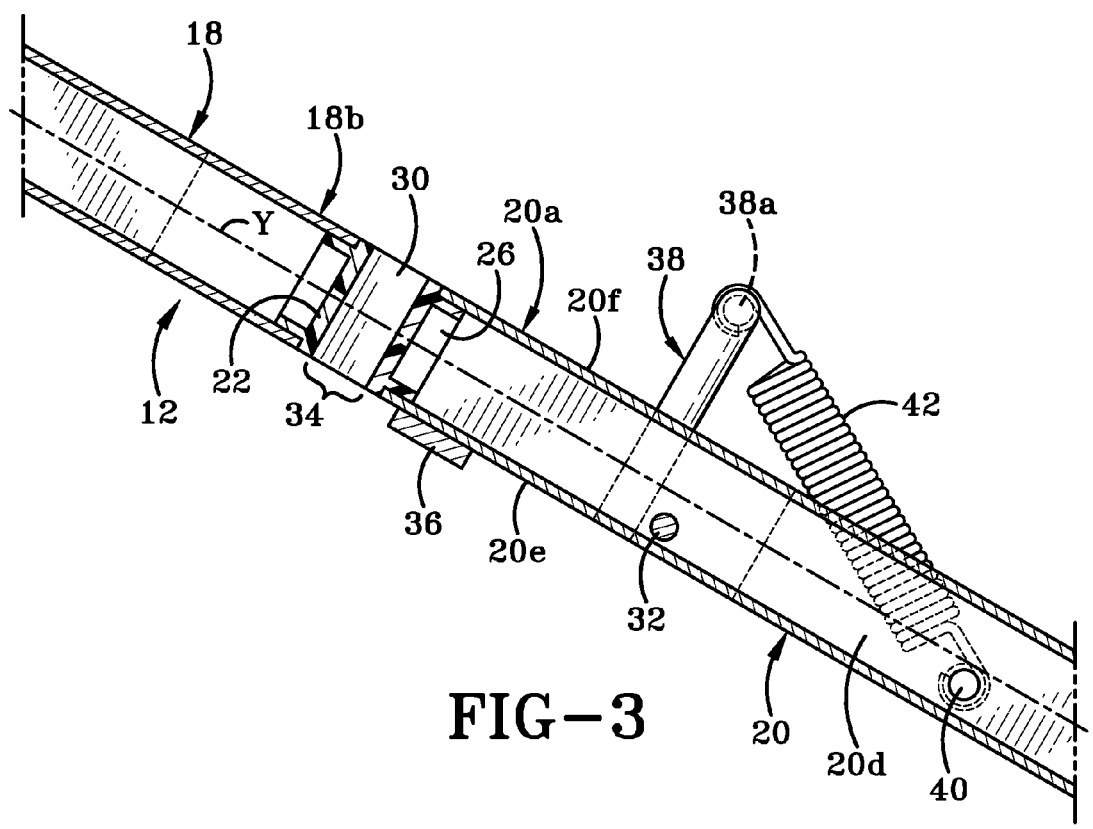
FIG. 3 is a cross-section taken along line 3-3 of FIG. 1.

As is evident from FIGS. 1 and 3, there is a gap 34 defined between second end 18b of first member 18 and first end 20a of second member 20. A stop 36 is welded between and to flanges 28 and 30 proximate first end 20a of second member 20 and is disposed adjacent a rear wall 20e (FIG. 3) of second member 20. Stop 36 is provided to limit the degree to which first and second members 18, 20 can pivot relative to each other, as will be hereinafter described.

An L-shaped rod 38 is welded to flange 30 and extends outwardly therefrom, with one of the legs 38a (FIG. 2) of the L-shaped rod 38 being disposed at right angles to flange 30. A second rod 40 is welded to sidewall 20d of second member 20, a spaced distance from first end 20a and a distance from rod 38. Rod 40 extends outwardly from sidewall 20d at right angles thereto. Thus rod 40 and leg 38a are disposed substantially parallel to each other. A spring 42 is engaged with and extends between leg 38a and rod 40. This spring assembly (rods 38, 40 and spring 42), thus also effectively secures first and second members 18, 20 together and helps to control the pivotal motion thereof.

A second L-shaped rod 44 is welded to the upper wall 20f. A leg 44a of rod 44 extends outwardly from upper wall 20f and substantially at right angles thereto. A washer 46 is engaged around leg 44a and is welded thereto. Washer 46 is provided as a stop on rod 44, the purpose of which will be hereinafter described.

Figure 2:
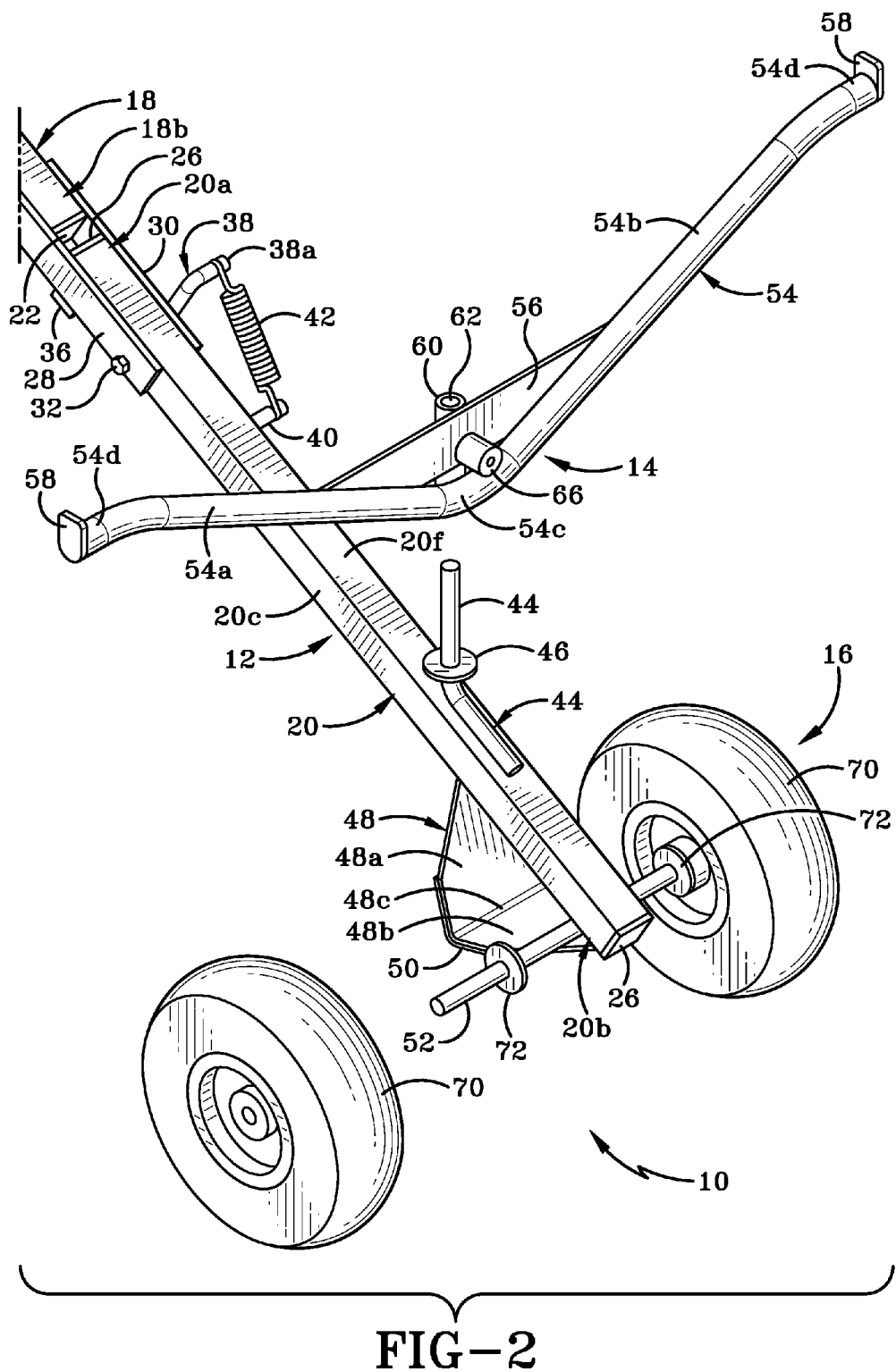
FIG. 2 is an enlarged partial perspective view of the lower end of the chute puller of FIG. 1.
Figure 4:
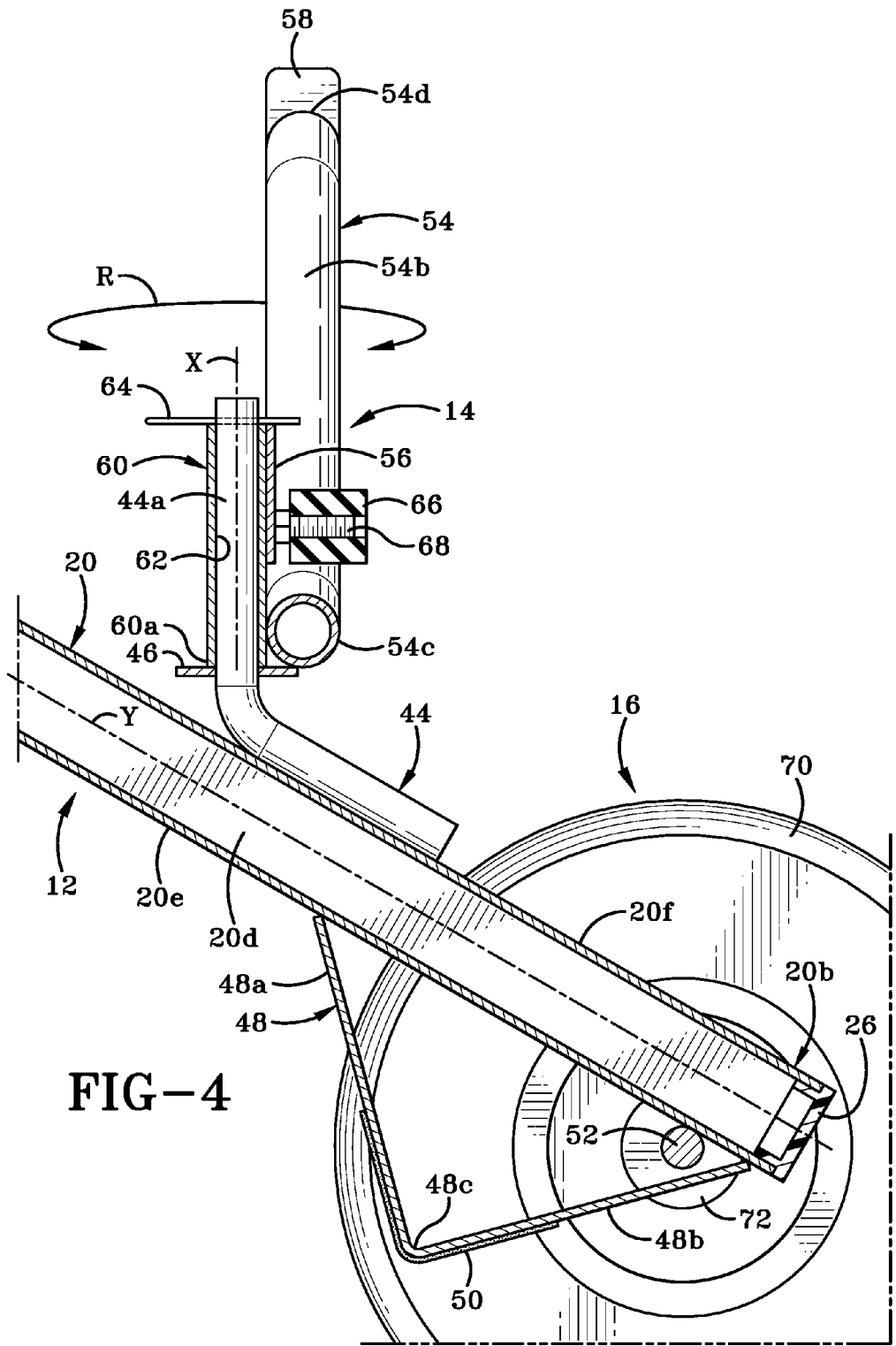
FIG. 4 is a cross-section taken along line 4-4 of FIG. 1.

A footrest 48 is welded to lower wall 20e of second member 20. As best seen in FIGS. 2 and 4, footrest 48 preferably comprises an L-shaped plate (when viewed from the side). The plate includes a first leg surface 48a and a second leg surface 48b which join each other at a right-angled corner 48c. First and second surfaces 48a, 48b are substantially identical to each other and each includes a first region that is generally rectangular in shape and a second region that is generally a truncated-triangular shape. The two generally rectangular regions are continuous with each other and the truncated apex of each surface is welded to lower wall 20e of second member 20. Thus, the corner 48c of this footrest 48 is spaced a distance away from lower wall 20e of second member 20.

A friction pad 50 is engaged with a portion of the exterior surface of footrest 48, and extends on either side of corner. Pad 50 includes some type of non-slip texturing or finish on its exterior surface to ensure that a user's foot will not slip off footrest 48 when operating puller 10.

Finally, an axle 52 of wheel assembly 16 is welded to lower wall 20e of second member 20, preferably in a position which is disposed intermediate the welds between legs 48a and 48b and lower wall 20e.

Referring still to FIGS. 1 to 4, crossbar 14 comprises a generally open-V-shaped length of pipe 54 which forms two arms 54a and 54b connected together by an intermediate section 54c. A strengthening gusset 56 extends between arms 54a and 54b and is spaced a distance upwardly away from intermediate section 54c. Gusset 56 is welded to each arm 54a, 54b and braces and strengthens crossbar 14. Each arm 54a, 54b terminates in a retainer 58 which is welded to pipe 54. It should be noted that a section 54d of each arm 54a, 54b adjacent the associated retainer 58 is formed so that it is generally horizontal in orientation is forms the free end of the associated arm. Each retainer 58 is welded to pipe 54 so that it is disposed generally at right angles to the adjacent horizontal section 54d. Furthermore, each retainer 54 extends for a distance outwardly beyond an exterior surface of the horizontal section 54d, as may be seen in FIG. 2 and FIG. 4. The purpose of the retainer 58 will be described later herein.

In accordance with an aspect of the disclosure, a sleeve 60 is welded to gusset 56. Sleeve 60 is positioned so as to align with vertical leg 44a of second rod 44 on second member 20. Sleeve 60 defines a bore 62 therethrough and into which vertical leg 44a of second rod 44 is received when crossbar 14 is engaged with bar 12. As shown in FIG. 4, when crossbar 14 is engaged with bar 12, sleeve 60 slides downwardly over leg 44a until a bottom end 60a of sleeve 60 is disposed adjacent an upper surface of washer 46. A cotter pin 64 is then passed through apertures (not numbered) in vertical leg 44a to lock leg 44a and sleeve 60 together. As will be understood and as is shown in FIG. 4, crossbar 14 is free to rotate about an axis "X" extending along leg 44a. The rotation is indicated by the arrow "R".

In accordance with another aspect of the disclosure, a bumper 66 is engaged with gusset 56 and is disposed on the face of gusset 56 opposite the face to which sleeve 60 is welded. Bumper 66 is secured to gusset 56 by a bolt 68 and is able to be rotated on bolt in one or the other of a first direction and a second direction to increase or decrease its effective length and therefore the extent to which it extends outwardly and forwardly from gusset 56. The reason for this adjustability will be described later herein.

Wheel assembly 16 comprises a pair of wheels 70 which are engageable on axle 52 welded to second member 20. A pair of washers 72 is welded to axle 52 to act as stops to limit the distance at which wheels 70 may be positioned relative to second member 20. When each wheel 70 is engaged on axle 52, a cotter pin 74 (FIG. 1) is passed through apertures (not shown) in axle in order to secure wheel 70 thereto.

FIGS. 5-10A show chute puller 10 in use. In these figures, there is illustrated, in very simple terms, a livestock chute 76. Chute 76 is illustrated as including a frame 78 having a front end 78a and a rear end 78b. It should be understood that, although not illustrated herein, frame 78 is generally rectangular in shape when viewed from either side and from the front and back. In other words, frame 78 is generally a rectangular cube in shape and includes a pair of spaced apart sides 78c (FIG. 6A) which extend between front end 78 and rear end 78b. It should further be understood that a front gate (not illustrated herein will be provided at front end 78a. It should also be noted that in FIGS. 5-10A some of the smaller components of chute puller 10, such as cotter pin 64, have been omitted because of the scale of the drawing and the difficultly in illustrating these smaller components within any clarity in these figures.

A pair of U-shaped handles 80 (FIG. 6A) is welded to the front end 78a of frame 78 of chute 76. Each handle 80 is disposed proximate one the sides 78c of frame 78. As illustrated in FIG. 5, each handle 80 is positioned a short distance away from the bottom 78c of chute 76. An aperture 82 is defined between handle 80 and frame 78.

Chute 76 further includes a pair of wheels 84 mounted on frame 78 at rear end 78b and positioned to engage the ground 86. (Although not illustrated herein, it will be understood that wheels 84 are spaced laterally from each other and preferably are disposed adjacent the sides 78c of frame 78.) FIG. 5 shows that substantially the entire bottom 78c of chute 76 rests on ground 86. Obviously, in this position chute 76 will be extremely difficult to move across ground 86. This is the typical position in which chute 76 could be used to examine or treat cattle as it will not readily move across ground 86.

FIGS. 5 and 6 illustrate chute puller 10 in an initial collapsed position. In this position, first member 18 is disposed at an angle α relative to second member 20 and the angle α is less than 90° and, more particularly, is less than 180°. This compact collapsed position allows for easier storage when puller 10 is not in use. It is also the position into which chute puller 10 has to be moved in order to be able to engage handles 80 proximate bottom 78d of chute 76. Chute puller 10 is moved to a position adjacent chute 76 (FIG. 6) and is oriented so that wheels 70 are spaced a short distance away from handles 80. Additionally, rod/handle 24 of chute puller 10 is positioned a distance from handles 80 and is fairly close to the ground surface 86.

Figure 6A:
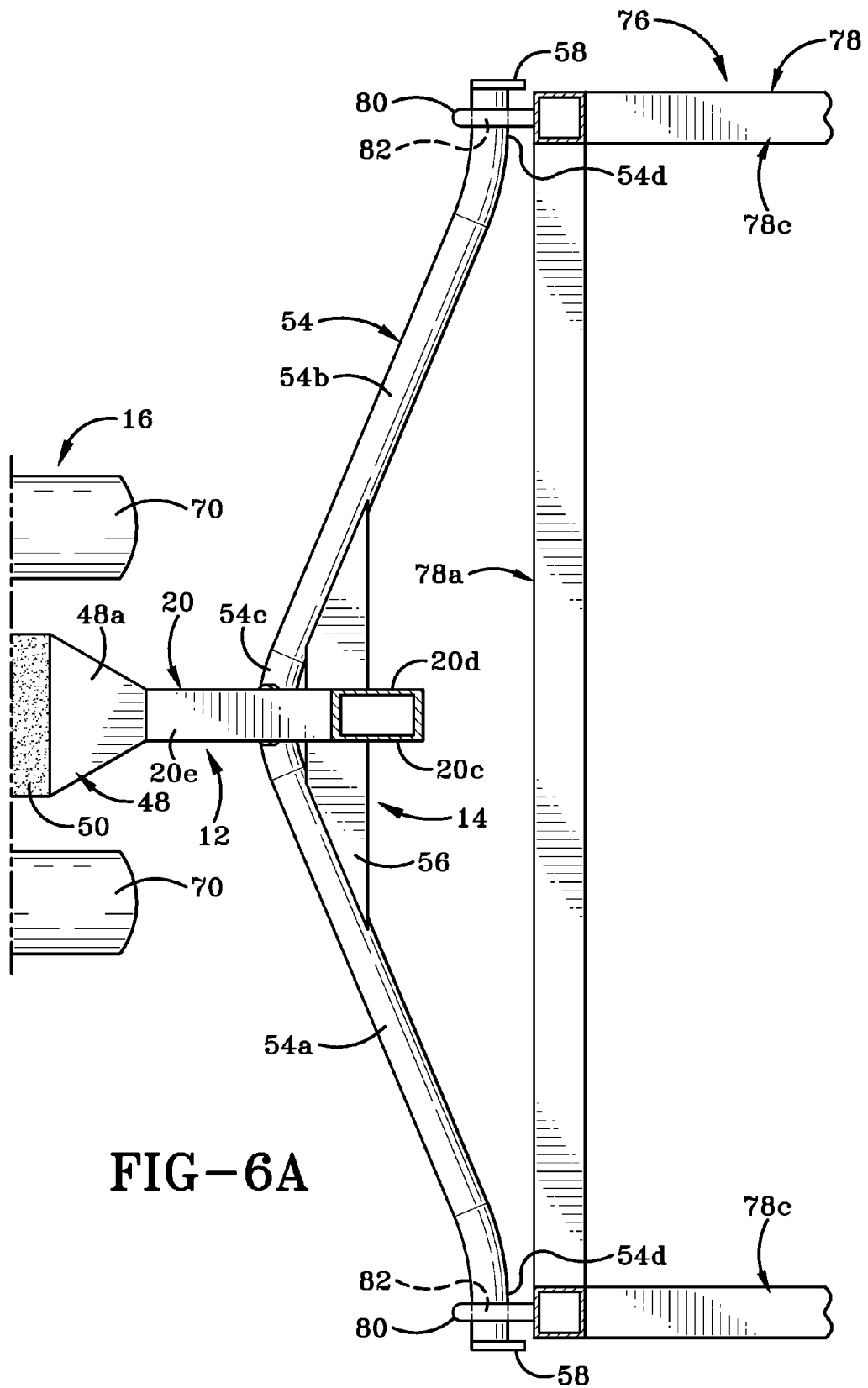
FIG. 6A is a top view of the chute puller and chute taken along line 6-6 of FIG. 6.

FIG. 6 shows a person 88 grasping handle 24 of chute puller 10 and moving puller 10 forwardly and downwardly in the direction of arrow "A" and inserting the end of arm 54a, including retainer 58, into aperture 82 defined by handle 80. (The end of arm 54b will similarly be inserted into the aperture of the second handle on the other side of chute 76.) This engagement of the two arms 54a, 54b is shown in FIG. 6A. It will be noted from FIG. 6A that retainers 58 are disposed on the opposite side of each handle 80 relative the rest of the arms 54a, 54b. In this initial insertion position, arms 54a, 54b are not in actual engagement with the handles 80, the free ends of the arms 54a, 54b and retainers 48 have simply been inserted through the apertures 82 defined by handles 80. At this point, puller 10 is generally engaged with chute 76 but chute 76 remains with its bottom 78c seated on ground 86. Chute puller 10 also bears no load upon its arms 54a, 54b at this stage.

Figure 7:
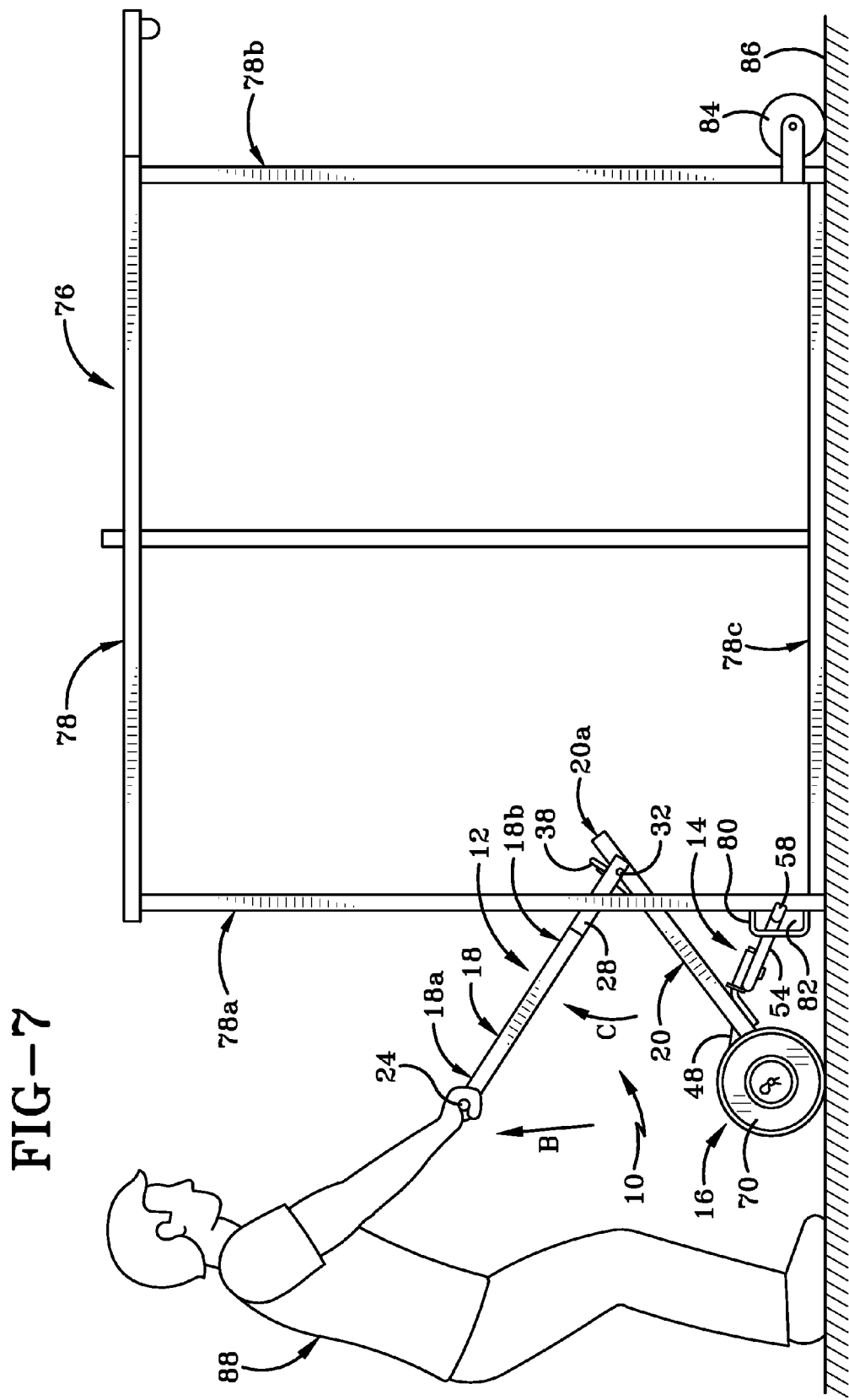
FIG. 7 is a right side view of the chute puller and the chute showing the user pivoting the first section of the bar relative to the second section thereof.

FIG. 7 shows the person 88 standing up and moving handle 24 upwardly in the direction of arrow "B" and thereby moving first member 18 away from the ground 86. This lifting of handle 24 causes first member 18 to pivot about bolt 32 and relative to second member 20. The pivotal motion is indicated by arrow "C". The pivotal motion causes spring 42 to stretch, thereby effectively resisting the motion so that the person 88 has to apply force to move first member 18 relative to second member 20. Again, FIG. 7 shows that the crossbar 14 is not carrying any load thereon and chute 76 remains with its bottom 78c seated on ground 86.

Figure 8:
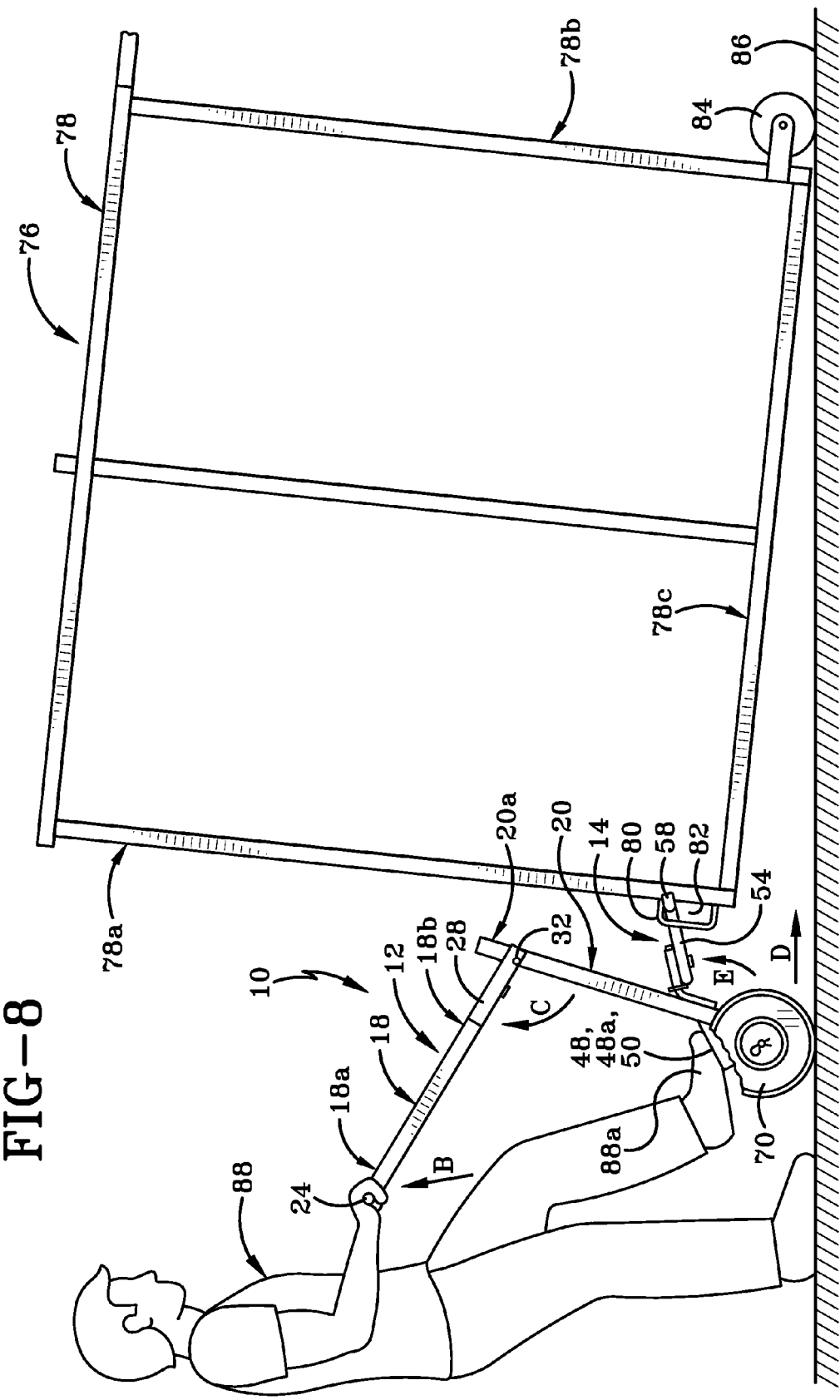
FIG. 8 is a right side view of the chute puller and the chute showing the user engaging the footrest and continuing to pivot the first section of the bar relative to the second section thereof.
Figure 9:
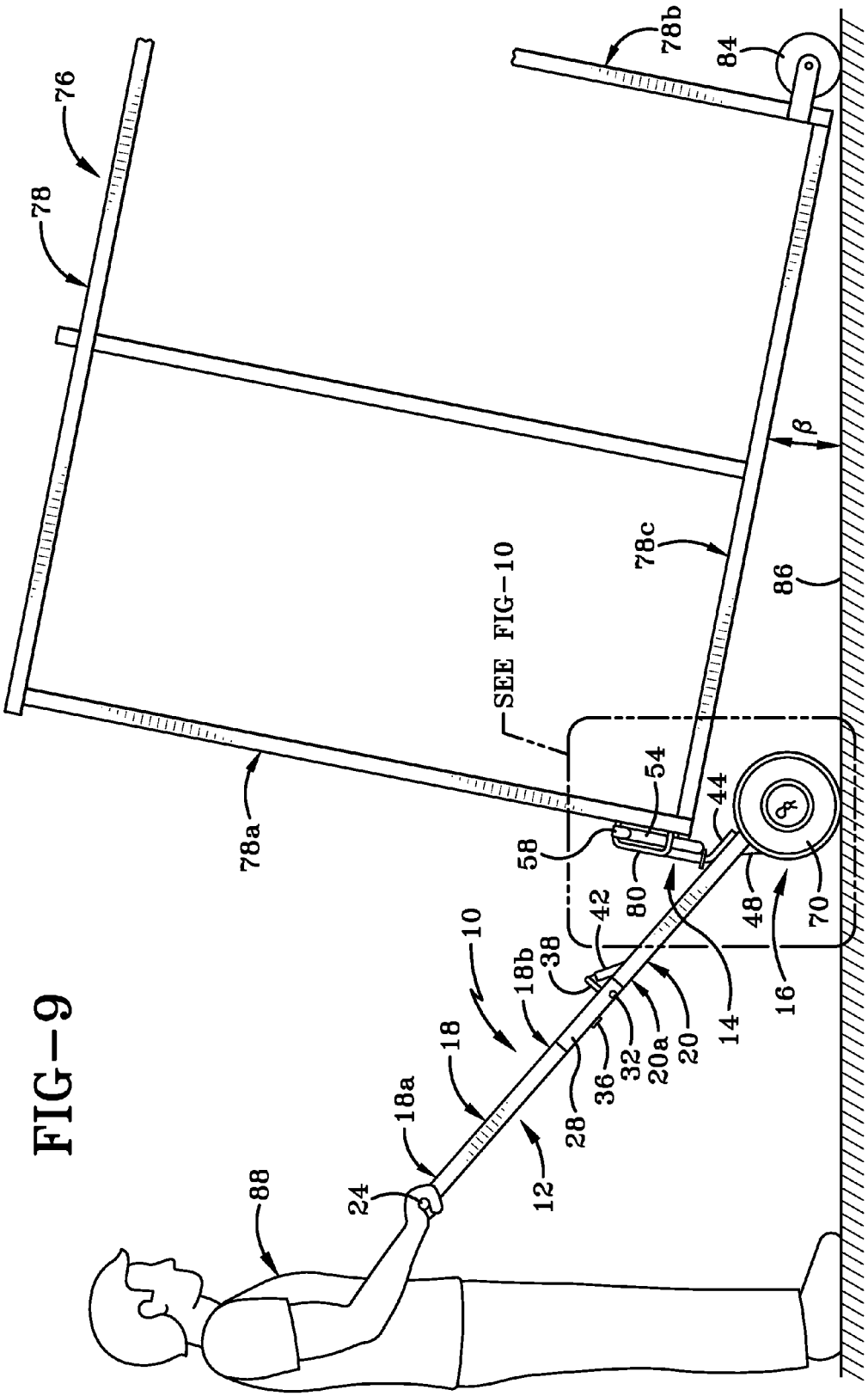
FIG. 9 is a right side view of the chute puller and the chute with the chute puller shown in the fully erected position and the chute puller lifting a front end of the chute off the ground and into a position where the chute is able to be moved by the single person using the chute puller.
Figure 10:
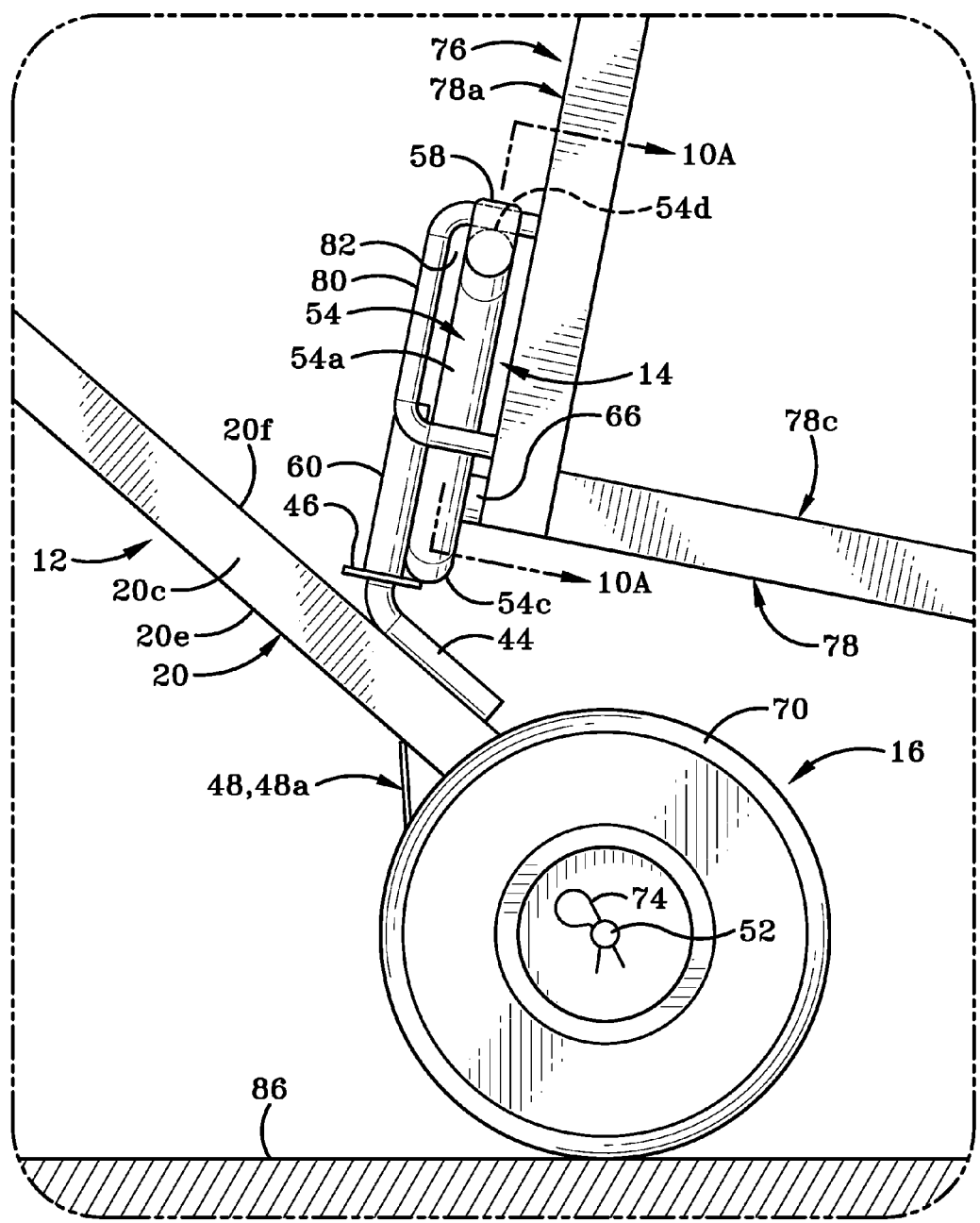
FIG. 10 is an enlarged right side view of the highlighted region of FIG. 9.

FIG. 8 shows the person 88 placing their foot 88a onto footrest 48 (part of wheel 70 has been cut-away to illustrate this) while continuing to lift handle 24 in the direction of arrow "B", and pivoting first member 18 relative to second member 20 in the direction of arrow "C". The person 88 simultaneous pushes downwardly and forwardly on footrest 48. The pushing motion on footrest 48 causes first member 18 to align with second member 20 along the same plane; i.e., they are disposed at 180° relative to each other. This is illustrated in FIGS. 9-10A. The pushing motion on footrest 48 also causes wheels 70 to roll toward chute 76 in the direction of arrow "D" and causes arms 54a, 54b of crossbar 14 to rotate upwardly in the direction of arrow "E". The arms 54a, 54b, particularly the horizontal sections 54d thereof, contact the underside of the top of the two handles 80 (see FIGS. 10 and 10A) and as the person 88 continues to push downwardly and forwardly on footrest 48, crossbar 14 lifts the front end 78a of chute 76 off the ground 86 and wheels 70 roll under the front end 78a. Thus, the weight of the front end 78a of chute 70 is born by arms 54a, 54b and wheels 70. The front end of the chute 76 is lifted off the ground by a lever-type motion. The person uses their leg, which is stronger than their arms, to generate the chute-lifting motion by pushing on the footrest 48, thus rolling the wheels 70 forwardly and under the front end 78a of chute 76.

FIGS. 9 and 10 show the final, fully erected position of chute puller 10, where first member 18 has pivoted relative to second member 20 to the point that first end 20a of second member 20 comes into contact with stop 36 and the rotational motion is stopped. Spring 42 returns to its original length when first and second members 18, 20 are disposed in the same plane and aligned with each other. Thus spring 42 also resists further rotation of first member 18 relative to second member 20 and helps retain first and second members in this aligned orientation relative to each other.

It should be noted that when chute puller 10 is in this final position the wheels 70 thereof are located rearwardly of front end 78a of chute 76. More particularly, axle 52 is located rearwardly of front end 78a. Because of this, the person 88 can actually let go of handle 24 and chute puller 10 will remain in the position shown in these two figures. It should also be noted that when chute puller 10 is in this position supporting the weight of the front end 78a of chute 76 thereon, footrest 48 acts as a bracing and strengthening member for second member 20. Furthermore, the sleeve 60 of crossbar 14 rests upon washer 46 and is supported thereon. Additionally, retainers 58 extend outwardly and upwardly beyond the sides of handles 80 (FIGS. 6A and 10A) and prevent arms 54a, 54b from accidentally slipping out of apertures 82 defined by the handles 80.

FIG. 10 also shows that bumper 66 extends outwardly beyond arms 54a, 54b. Bumper 66 is positioned to contact front end 78a of frame 78 when arms 54a, 54b are engaged in handles 80 and are being used to lift front end 78a of chute 76 off ground 86. Bumper 66 substantially prevents any tendency of the lower regions of crossbar 14 (i.e., the regions adjacent washer 46) from rotating forwardly toward the portion of front end 78a below handles 80. If bumper 66 is not in contact with front end 78a of frame, the user can simply rotate bumper 66 about the bolt 66 so that bumper 66 is moved to a position further outwardly from gusset 56. If it found that bumper 66 is extending too far outwardly from gusset 56 so that front end 78a is bringing too much weight to bear on bumper 66, the person can rotate bumper 66 in the opposite direction on bolt 68 until the correct supportive position for bumper 66 is attained.

The person is now singlehandedly able to move chute 76 along ground 86 using chute puller 10 because chute 76 is now supported on four wheels, namely wheels 84 and wheels 70. It is possible to push or pull chute 76 using chute puller 10 but the pulling motion is preferred as being more effective. Chute puller 10 is also able to move chute 76 around corners because crossbar 14 is able to pivot about leg 44a of L-shaped rod 44. The pivotal motion is facilitated because sleeve 60 is not fixedly engaged with leg 44a but is free to rotate about the same.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A mobile livestock chute pulling system comprising:
    a livestock chute having opposing sides, a front end and a back end, all extending upwardly from a bottom; said chute including a pair of wheels provided on the back end; and
    a chute puller configured to engage the front end of the chute and to move the chute across a ground surface; wherein the chute puller includes;
        an elongated bar member having opposed first and second ends;
        a handle provided proximate the first end of the bar;
        a wheel assembly provided proximate the second end of the bar; and
        a crossbar disposed above the bar and being disposed generally at right angles thereto; wherein the crossbar includes a retainer and the cross bar is adapted to engage an end of the livestock chute and lift the engaged end of livestock the chute off the ground surface.

2. The mobile livestock chute pulling system of claim 1, further comprising a spring assembly on the chute puller disposed below the crossbar adjacent the wheel assembly pivoting the first member of the chute puller from a first position where it is disposed at an angle relative to the ground surface, to a second position different than the first position;
and adjacent the bar intermediate the first and second ends to assist in lifting the front end of the livestock chute off the ground.

3. The mobile livestock chute pulling system of claim 1, further comprising:
    a free end at each side of the cross bar that is adapted to support the end of the livestock chute;
    wherein the retainer on the cross bar includes a pair of retaining plates permanently secured to opposed side surfaces of the cross bar; and, the retaining plates extend along a width of the crossbar; wherein the pair of retaining plates comprises at least one plate oriented substantially at a right angle to the free end of the crossbar; and the at least one plate extends for a distance outwardly beyond an exterior surface of the free end in at least one direction.

4. The mobile livestock chute pulling system of claim 3, wherein the front end of the livestock chute is supported between the pair of retaining plates.

5. A method of moving a livestock chute from a first location to a second location across a ground surface; said method comprising the steps of:
    providing a chute puller including a wheel assembly, a bar extending outwardly from the wheel assembly; said bar including a first end and a second send; a handle proximate the first end and the wheel assembly is engaged with the second end; and a crossbar adjacent the bar intermediate the first and second ends;

attaching a portion of the crossbar to an end of the livestock chute and retaining the end of the livestock chute with a retainer;

raising the end of the livestock chute away from the ground surface using the bar and thereby lifting the end of the livestock chute upwardly away from the ground surface; and moving wheels on the wheel assembly into a position where they are disposed vertically lower than the end of the livestock chute.

6. The method as defined in claim 5, further including the steps of:

supporting the chute on the wheels of the wheel assembly and on one or more wheels provided on a back end of the chute;

pulling the handle on the first end of the bar to roll the wheels of the wheel assembly and the wheels on the chute over the ground surface.

7. The method as defined in claim 6, wherein the chute puller is operable by a single person to move the livestock chute over the ground surface.

\* \* \* \* \*